March 28, 1933.  H. D. COLMAN ET AL  1,903,229
ELECTRIC VALVE OPERATOR
Filed Jan. 2, 1930    2 Sheets-Sheet 1

INVENTOR
Howard D. Colman
BY and Duncan J. Stewart
ATTORNEYS

March 28, 1933.    H. D. COLMAN ET AL    1,903,229
ELECTRIC VALVE OPERATOR
Filed Jan. 2, 1930    2 Sheets-Sheet 2

INVENTOR
Howard D. Colman
BY and Duncan J. Stewart
ATTORNEYS

Patented Mar. 28, 1933

1,903,229

UNITED STATES PATENT OFFICE

HOWARD D. COLMAN AND DUNCAN J. STEWART, OF ROCKFORD, ILLINOIS; SAID STEWART ASSIGNOR TO SAID COLMAN

ELECTRIC VALVE OPERATOR

Application filed January 2, 1930. Serial No. 417,989.

The invention relates to an electrically driven valve operator and has more especial reference to an operator adapted for the actuation of heat control valves of the type employed in regulating the flow of heating medium to a radiator or the like.

In view of the conditions under which power operators for radiator control valves are used, they must, to be practicable, meet various requirements not heretofore satisfied by operators employing electricity as the motive power. Thus, it is essential that the operator be capable of being mounted directly on the valve body and because of the relatively small and restricted spaces available for the purpose of accommodating the operator it is of vital importance that its dimensions be properly coordinated with such restricted spaces. Of primary importance in producing an electric operator of small size is that a small motor be used, and to this end it is necessary that the force which must be applied to the seating and unseating of the valve member be reduced to a minimum. Furthermore, a construction and arrangement should be employed which will insure a high degree of durability as well as a low manufacturing cost; and the unit as a whole should be effectually enclosed for purposes of protection and appearance, without interfering with ease of assembly and accessibility.

With the foregoing in view, our general aim has been to produce an electrically driven valve operator of a thoroughly practical character.

More particularly stated, the primary object of the invention is to provide an electrically driven operator having a novel arrangement of parts resulting in an exceedingly compact structure such that it may be mounted directly upon the body of a radiator control valve and wholly enclosed within a relatively small casing.

A further object is to provide an operator of the above character in which the parts are advantageously arranged in a supporting frame or enclosed in a small casing removable to permit of ready access to the parts.

The objects of the invention thus set forth, together with other and ancillary objects and advantages, are attained by the construction and arrangement shown in the accompanying drawings wherein the preferred embodiment only of the invention has been illustrated.

Figure 1:
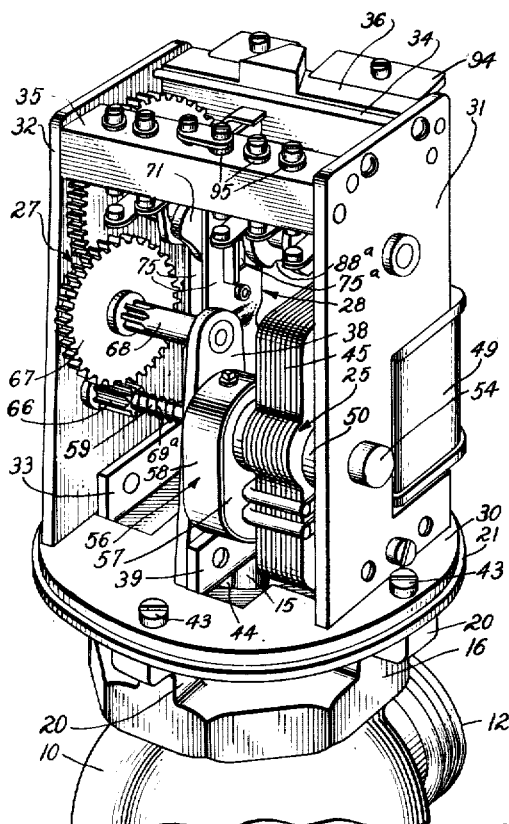
Figure 1 is a perspective view of our improved operator with the enclosing cover removed, the operator being shown secured to a radiator control valve.

The valve to which the operator is applied comprises as herein shown a casing or body 10 having an inlet 11 and an outlet 12. A valve member 13 is reciprocable axially toward and from a seat 14 in the casing, the valve member having an operating stem 15 projecting through an opening in one wall of the casing, which opening is formed by an annular wall portion externally screw-threaded to receive an internally screw-threaded cap 16. A bellows diaphragm 17 provides a seal to prevent the escape of the heating medium from the casing in a well known manner, the outer end of the diaphragm being secured to a plate 18 which is clamped between the cap 16 and the casing 10. The plate 18 has a central aperture 19 therein through which the stem 15 projects, and the cap 16 is similarly apertured.

Formed integral with the cap 16 is a support for the valve operator, which support is in the form of a spider having upwardly and outwardly extending arms 20. Upon the ends of said arms rests a plate 21 having a centrally depressed portion 22 apertured to receive rather snugly the valve stem 15. This construction insures that any steam or vapor which may leak past the diaphragm 17 shall be deflected from the operator through the spaces between the arms 20.

Figure 3:
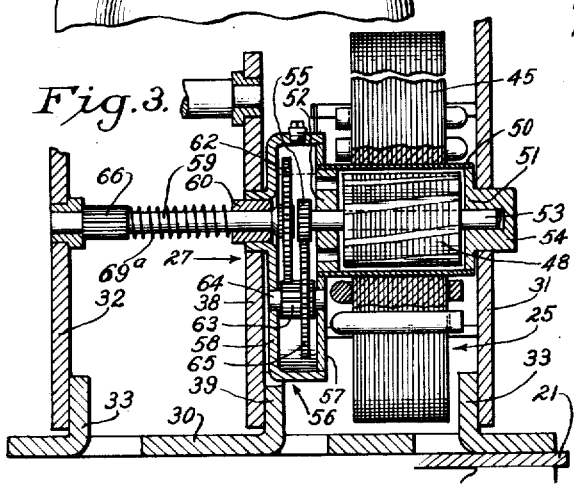
Fig. 3 is a fragmentary sectional view through the motor and a portion of the gear train.
Figure 4:
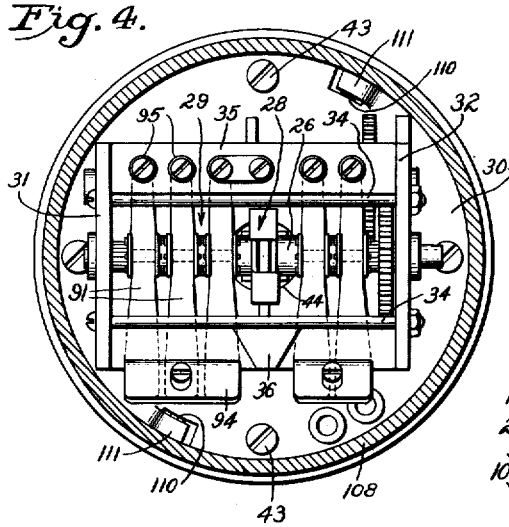
Fig. 4 is a plan view of the operator, the cover being shown in transverse section.

The operator in the preferred embodiment comprises in general an electric motor 25, a main operating shaft 26, a torque multiplying gear train 27 connecting the motor shaft with the main shaft (Figs. 1 and 3), a reciprocable actuator 28 operatively associated with the main shaft and connected with the valve stem 15, and a controlling switch mechanism 29 for effecting successive valve opening and closing movements in alternate cycles. Of these several elements, the reciprocable actuator 28 constitutes a central axis relative to which the other elements are symmetrically arranged to form a small compact operating unit of proper longitudinal and transverse dimensions.

Referring now to the preferred arrangement employed, the reciprocable actuator 28 is connected at one end to the axial valve stem 15 so as to form an extension thereof; and the main operating shaft 26, which is operatively associated with the opposite end of the actuator, is disposed in perpendicular relation thereto thus intersecting the axis of the valve stem.

The motor 25 is positioned adjacent one side of the actuator and has its shaft extending in a direction parallel with the main operating shaft so that the gearing connection 27 may be in the form of a spur gear train. Preferably the shaft 26 is disposed above the motor, and the switch mechanism 29 is associated with this main shaft, above it, so as to occupy a conveniently accessible position.

To support the various parts in the relation set forth, a frame is provided consisting of a circular base plate 30 and a pair of upstanding side plates 31 and 32. The latter are secured at their lower ends to lugs 33 struck up from the base plate, and are connected at their upper ends by tie rods 34, with blocks 35 and 36 of suitable insulating material interposed between the plates and constituting spacers.

The two side plates 31 and 32 provide bearing standards for the opposite ends of the main operating shaft 26. An additional bearing member is provided in the form of a smaller intermediate plate 38. This plate 38 is secured at its lower end to a struck up lug 39 on the circular base plate, and coacts with the main side plate 32 to provide bearings for supporting the gear train 27.

The base plate 30 rests upon the plate 21 and fastening screws 43 are entered through both plates and threaded into the ends of the arms 20 on the valve cap. When the operator is secured in position upon the valve, the stem 15 projects centrally into the lower portion of the supporting frame, a central aperture 44 being provided in the base plate 30.

The motor 25 is of the single phase induction type, having a relatively flat field member or stator 45 of laminated construction. The stator is advantageously made in the form of a flat substantially rectangular frame, one side member of which is constructed to provide two opposed poles 46 and 47 (Fig. 6) between which is mounted a rotor 48 of the squirrel cage type. The opposite side portion of the stator frame carries an energizing field coil 49 which is therefore positioned in laterally offset relation to the rotor.

The rotor 48 is enclosed within a cylindrical shell 50 (Figs. 1 and 3) fitting snugly in the air gap of the stator and having at opposite ends bearing members 51 and 52 for a driving shaft 53. The bearing member 51 constitutes a closure for the outer end of the shell 50, and has a central cylindrical projection 54 which is entered through an opening in the frame plate 31. The bearing member 52 has a central aperture through which the inner end of the rotor shaft projects, and on said projecting end is a pinion 55 forming part of the spur gear train 27.

The gear train 27 is in the present instance divided into a high speed section (Fig. 3) adjacent the motor, and a slow speed section (Fig. 1) adjacent the main shaft 26. The high speed section thus including the pinion 55 is enclosed within a casing 56 comprising a flat plate 57 apertured near one end to receive tightly the inner end of the rotor shell 50, and a deep-flanged cover 58 fitting tightly around the plate 57. Mounted in the wall of the casing opposite the plate 57 is one end of a shaft 59, a suitable bearing 60 being provided for this purpose; and secured on this shaft within the casing is a spur gear 62 meshing with a pinion 63 on a shaft 64 bearing at its ends in the opposite walls of the casing. Rigid with the pinion 63 is a spur gear 65 meshing with the pinion 55 on the motor shaft. The bearing 60 is supported in a cylindrical projection of the cover 58, and this projection is entered through an opening in the intermediate bearing plate 38 to support the casing and hence the motor.

The opposite end of the shaft 59 is journalled in the frame plate 32 and carries a spur pinion 66 meshing with a spur gear 67 (Fig. 1) on a counter shaft 68 whose opposite ends are journalled respectively in the frame plates 32 and 38. A pinion 69 (Fig. 5) on this counter shaft meshes with a spur gear 70 on the main operating shaft.

It will be seen that the gear train constitutes a four-step gear reduction between the motor shaft and the main operating shaft, and that the first two steps of this train are enclosed in the casing 56. The latter is adapted to contain a quantity of oil, the level of which is shown by a broken line in Fig. 3, to insure proper lubrication of the high speed gears and their bearings, and having the further advantage that it reduces the gear noise to a minimum. Both of these results are important in a heat regulating valve operator, where high temperatures prevail, and where quiet operation is highly advantageous.

To prevent the escape of lubricant from the bearing 60 in the casing, a coiled spring 69ᵃ is provided on the shaft 59 so as to hold the hub of the gear 62 in sliding contact with the inner face of the bearing 60. On the other hand, the bearing member 52 in the opposite wall of the casing is apertured to permit the flow of oil from the casing to the tubular rotor shell through which it may pass to the bearing member 51.

The means for reciprocating the actuator 28 to impart positive opening and closing movements to the valve member 13, comprises in the preferred construction a cam 71 (Fig. 2) secured centrally on the operating shaft 26 and coacting with two follower rollers 72 and 73. The latter are mounted in the actuator on diametrically opposite sides of the cam, and are supported between two plates 75 spaced a short distance apart and longitudinally slotted and flanged to form guides 75ᵃ coacting with the shaft 26 in the lengthwise movement of the actuator. Thus the actuator is effectually guided for rectilinear motion, which is advantageous from the standpoint of space consumed thereby.

A yielding lost motion connection is provided between the actuator and the valve stem 15, of a character such that at the end of the valve closing cycle the valve member is held to its seat with a predetermined pressure. To this end the lower end of the actuator is constructed to form a tubular stem 77. Thus it is made in two segments (Fig. 5) respectively integral with the plates 75 at the upper end of the actuator. The lower end of the stem 77 is closed by a fixed cap 78 which serves to hold the two segments together, and within the tubular stem is a coiled expansion spring 79 bearing at its lower end upon a washer 80. In the assembled relation of the parts the washer 80 bears upon the upper end of the valve stem 15, and the latter is transversely apertured to receive a bolt 81 the ends of which pass through slots 82 in opposite side walls of the stem. The slots 82 are of a length such that after the valve member, in the closing cycle engages its seat 14, the actuator is permitted to continue its movement as the spring 79 is compressed. In such continued movement the lower end of the actuator passes through the aperture 44 in the base plate 30, and enters the well formed by the depression 22 in the plate 21. This arrangement has the effect of reducing the overall length of the operator while permitting the use of a long seating spring.

The cam 71, it will be observed, is provided with relatively short diametrically opposed dwell surfaces 71ᵃ, and intermediate these dwell surfaces are steeply sloped surfaces 71ᵇ and gradually sloped surfaces 71ᶜ; and the proportions are such that in the valve closing cycle, after the initial portion of the rotational movement of the cam, the actuator 28 is moved rapidly into engagement with its seat, and then gradually slower while the spring 79 is being compressed, until finally the dwell is reached which renders the spring ineffective to exert a rotational force on the cam.

It will be observed that the operator as a whole may be removed from the valve by removing the screws 43 and disconnecting the actuator 28 from the valve stem 15, the latter being accomplished by removing the bolt 81. When the operator is removed the washer 80 engages with the inturned flange of the cap 78 and retains the spring 79 within the tubular stem 77. Moreover, such removal of the operator may be accomplished without opening the valve 10 to the atmosphere, the seal being maintained inasmuch as the cap 16 remains in position.

It will also be seen that by moving the valve actuator 78 positively in both directions, in combination with the seating spring 79 for holding the valve member to its seat with a predetermined pressure, the maximum power required to move the actuator at any time is that required to compress the spring during the engagement of the cam follower with the gradual slope 71ᶜ of the cam. Prior to such compression of the spring, no substantial resisting force opposes the movement of the actuator, because the bellows diaphragm permits relatively free movement of the valve member during the engagement of the cam follower with the steeply sloped cam surface 17ᵇ. Thus the use of a bellows diaphragm substantially reduces the load on the motor as compared to the use of a stuffing box which if tight enough to prevent the escape of steam must necessarily interpose a substantial degree of resistance to the movement of the valve.

Figure 2:
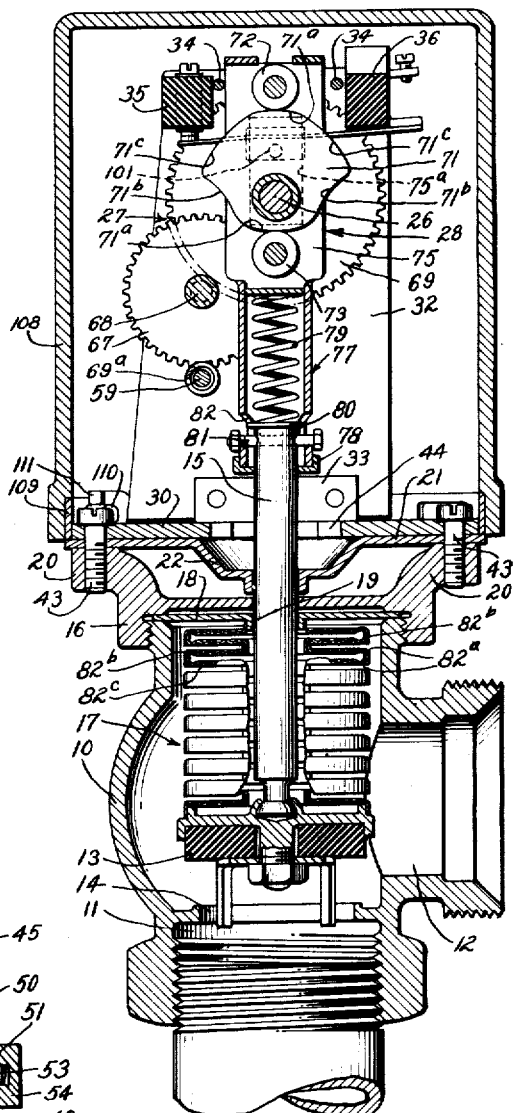
Fig. 2 is a central vertical sectional view through the operator and the valve.

The particular character of the diaphragm is, moreover, important in case of a valve operated under thermostatic control, since such valves being responsive to slight changes in temperature, operate very frequently. In order that the diaphragm will withstand such unusual strain, it is preferred to construct the same from separately formed centrally apertured disks 82ᵃ, as distinguished from diaphragms drawn from sheet metal tubing which are weakened in the drawing operation, especially at the inner and outer edges which are subjected to the greatest strain. As shown in Fig. 2, the disks 82ᵃ have their inner and outer peripheral edges secured respectively to the inner and outer edges of adjacent disks, and for the purpose of forming the joints between the disks they are formed with interfitting flanges 82$^b$ soldered together to form relatively stiff joints. By this construction the portions of the disks intermediate their peripheries flex or bend in the extension and retraction of the diaphragm, and because the disks are separately formed they may be corrugated circumferentially as at 82$^c$ to increase their flexibility. This latter feature it will be observed serves to decrease the resistance to the movement of the valve member and therefore further renders a valve having this type of diaphragm especially adapted for motor operation.

The switch mechanism 29 for governing the valve opening and closing cycles comprises (Fig. 6) three switches 83, 84 and 85 respectively operable by cams 86, 87 and 88 on the shaft 26. The cams 86 and 87 have oppositely disposed flat sides, while the cam 88 for the running switch has two diametrically disposed notches 88$^a$.

The switches 83 and 84 constitute starting switches coacting with two switches 89 and 90 of a suitable thermostat to initiate valve opening or closing cycles respectively. The switch 85 constitutes a running switch and is operable independently of the thermostat after the cycle has been initiated by one of the starting switches.

The movable contact of each of the switches 83, 84 and 85 is carried on the free end of a resilient arm 91 and the three arms are anchored on a metallic channel member 94 secured to the insulated block 36 (Fig. 2). Each of the stationary contacts of said switches 83, 84 and 85 is mounted in a plug 95, and the several plugs are embedded in the insulating block 35 and respectively connected electrically to the three switch contacts of the thermostat. In view of the location of these contact terminals on the end of the operator frame, they are readily accessible for connection with the current conductors regardless of the angular position of the operator frame after the same has been attached to the valve body. The intermediate or common contact of the thermostat is also connected to the grounded secondary 92 of a transformer having its primary 93 connected to a source of alternating current. The three movable switch arms 91, made electrically common through the metallic channel member 94, are connected with the main field coil 49, the latter being grounded.

Figure 6:
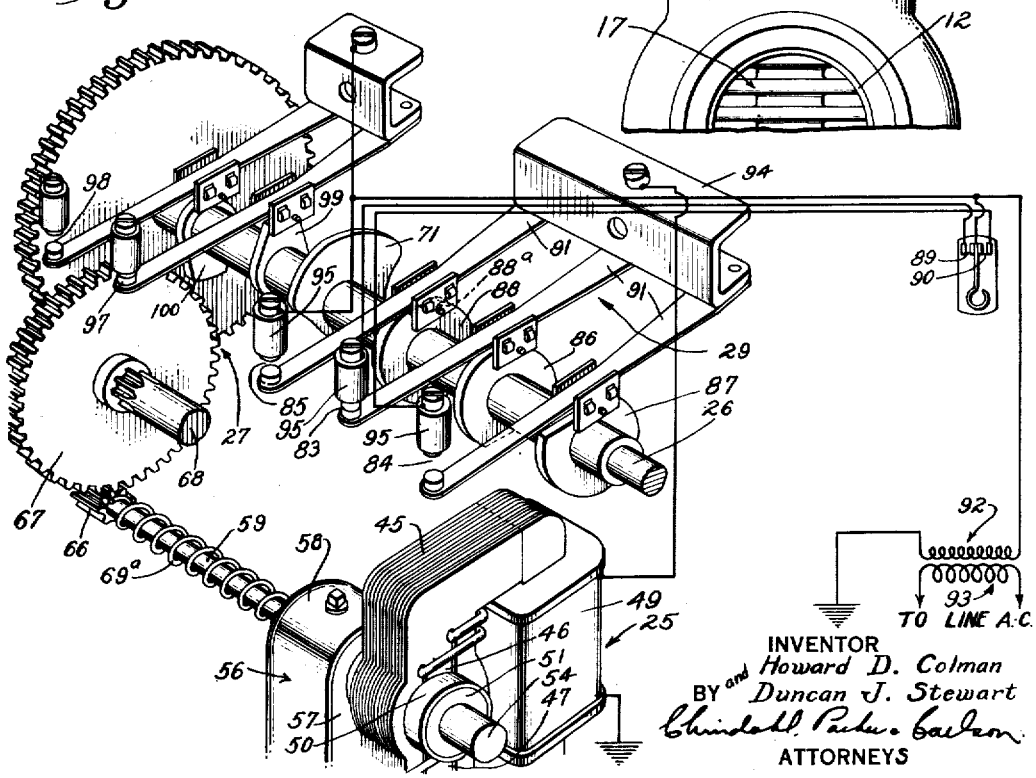
Fig. 6 is a schematic view showing the control mechanism with the principal parts of the operator in perspective.

With the parts in the relation shown in Fig. 6, the starting switch 83 is closed and when the thermostat switch 89 is closed, the coil 49 is energized and the motor operated. In the initial portion of the movement of the shaft 26, the running switch 85 is closed, and the cycle is terminated by the opening of the running switch 85 after one-half revolution of the shaft 26. At this time the starting switch 83 is also opened, and the starting switch 84 is closed ready for the next operating cycle subject to the control of the thermostat switch 90.

In addition to the switches 83, 84 and 85, two switches 97 and 98, respectively controlled by cams 99 and 100, are shown, so that in all five switches are controlled by as many cams all on the operating shaft 26. The two switches 97 and 98 may be employed in the control of another valve operator without the use of a separate thermostat, as fully set forth in Patent No. 1,844,841.

Figure 5:
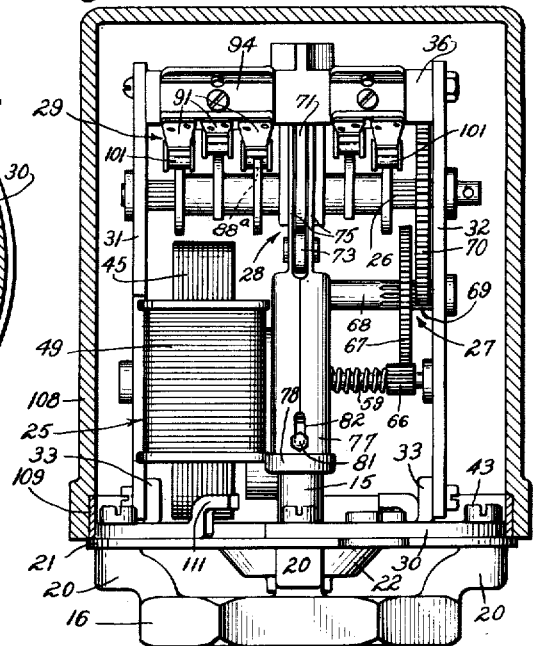
Fig. 5 is a fragmentary elevational view of the valve with the operator thereon, the cover being in section.

The movable switch arms for the switches 83, 84, 85, 97 and 98 are operated by their respective cams through the medium of insulated follower rollers 101 (Fig. 5).

It is desirable that the operation of the motor be stopped quickly at the end of each operating cycle, at which time the running switch is in open position with the roller follower 101 seated in one of the notches 88$^a$ of the cam 88. These notches are made relatively short so as to reduce to a minimum the time during which the current flows through the thermostat contacts, and it is essential that the motor stop promptly after the running switch has been opened.

To insure that the motor shall not overrun after the running circuit is opened, it is desirable to employ a suitable brake for the motor. This brake in the present instance is provided by the oil bath in the gear casing 58, interposing a constant resistance to the rotation of the high speed section of the gear train 27. As soon as the supply of current to the motor is interrupted, the lubricant in the casing exerts a sufficient retarding force to stop the motor during the engagement of the follower roller 101 in one of the notches 88$^a$ of the running switch cam 88.

The entire operating unit is enclosed by a cylindrical casing 108 with a lower open end seated upon the peripheral edge of the plate 21. Within the lower end of the casing is a metallic band 109 carrying at spaced intervals pins 110 (Fig. 2) adapted to interlock with bent lugs 111 struck up from the base plate 30, the interlocking action being obtained by a slight twisting of the casing relative to the base plate. Thus the enclosing casing is readily removable so as to permit easy access to the operating mechanism.

It will be apparent that by the construction and arrangement set forth we have provided an operator especially adapted for use on radiator control valves. It has been found to meet effectually the requirements for a commercially practical device, first, because its longitudinal and lateral dimensions are properly coordinated with reference to the character of the small and restricted spaces ordinarily provided for radiator control valves. Thus the entire unit, together with the enclosing casing requires no greater space than that consumed in many instances by ordinary hand operators. This characteristic feature has, it will be observed, been accomplished by advantageously arranging the parts in a small compact unit, of which the valve actuating stem forms a central axis relative to which the main operating shaft is disposed transversely with the torque multiplying gear train, and the switch control mechanism so disposed as to form a substantially symmetrical whole.

A second feature which is of importance in producing a practical operator concerns the use of an actuator for the valve member consisting of a reciprocatory stem, and a cam having an operative connection with the stem such that the valve member is actuated positively both in the opening and closing cycles. In both cycles, the motor operates in the same direction, thus simplifying the electrical connections and switch mechanism.

Seating of the valve member, where a cam is used to effect movements of fixed length to the actuator, is insured by the use of a spring of substantial length, which permits of a large range of movement during compression with little change in pressure and so compensates for slight variations in the manufacture of the spring. Thus after the valve member engages the seat, the spring is compressed to a predetermined maximum and serves to hold the valve member against its seat while at such maximum. By this arrangement the power of the motor is most effectively applied to the operation of the valve, and injury to the parts, in the event that small particles should become lodged between the valve member and the seat, is avoided.

Also it is advantageous to employ a cam shaped so as to effect a rapid movement of the valve member toward its seat, followed by a gradual movement in which the seating spring is compressed, the slope of the cam surface progressively decreasing and finally ending in a short dwell. This reduces the time required for the valve closing operation, as well as the power necessary to be employed, and the dwell at the end of the cycle insures that the valve member will be held against its seat regardless of slight variations in the point of stoppage of the motor.

Still another feature of our operator consists in the employment of a small motor, this being feasible through the reduction to a minimum of the power required to move the valve member. Thus the flexible diaphragm forming the seal about the valve stem, offers substantially no resistance to the movement of the valve member, and the cam with its two roller followers disposed in the axis of the stem provides an efficient type of power transmitting means.

In addition to the compact arrangement of the parts of the structure, the arrangement employed is advantageous from the standpoint of wear and durability. Thus the disposition of the motor shaft in parallel relation to the main operating shaft with a spur gear torque multiplying connection between the two shafts possesses a substantial degree of advantage over the arrangements heretofore employed.

The organization of the parts moreover in the simple frame structure provided is such as to render the parts readily accessible by simply removing the enclosing casing.

This application is a continuation in part of our copending application Serial No. 261,487, filed March 14, 1928.

We claim as our invention:

1. An electrically driven operator for radiator control valves and the like comprising, in combination with a valve casing having a valve member movable axially toward and from a seat in the casing, a rotatably mounted shaft disposed transversely of and substantially intersecting the axis of the valve member, an electric motor having a torque-multiplying driving connection with said shaft, an actuating device comprising a reciprocatory member and an actuating element fast on the shaft and operable upon said member in the operation of the motor in one direction to impart positive movements of fixed length to said member in opposite directions, a yieldable lost-motion connection between said reciprocatory member and said valve member through which the valve member is opened and closed in the reciprocation of said member, and a controlling switch mechanism for the motor actuated in the rotation of said shaft to define successive valve opening and closing cycles, said lost-motion connection including a spring, and said actuating device being operable during the valve closing cycle first to move the valve member into engagement with its seat and then in the continued movement of said reciprocatory member to tension said spring, and said device being further operable through said spring upon the termination of the closing cycle to hold the valve member to its seat with a predetermined pressure.

2. An electrically driven operator for radiator control valves and the like comprising, in combination with a valve casing having a valve member movable axially toward and from a seat in the casing, a shaft disposed transversely of the axis of the valve member, an electric motor having a torque-multiplying driving connection with said shaft, a cam fast on the shaft and a follower for the cam engageable with opposite sides thereof and reciprocable in the rotation of the shaft in one direction, a yieldable lost motion connection between said follower and said valve member through which the valve member is opened and closed in the reciprocation of said member, and means operable to define successive valve opening and closing cycles by the motor, said lost-motion connection including a spring and said cam being operable during the valve closing cycle first to move the valve member rapidly into engagement with its seat and then to continue the movement of said reciprocatory member gradually to tension said spring, and said cam being further operable through said spring upon the termination of the closing cycle to hold the valve member to its seat with a predetermined pressure.

3. A power operator for a valve having a casing and a valve element movable toward and from a seat in the casing, said operator combining an elongated member projecting from said casing and arranged for endwise movement to actuate said element, a frame adapted to be mounted on said casing projecting therefrom in the direction of said member, a rotatable operating shaft extending transversely of said member and rotatively supported on said frame near the end thereof remote from said casing, driving means for said shaft supported by said frame between said shaft and said valve casing and including an electric motor, and a speed reducing mechanism connecting the motor shaft with said operating shaft, said frame and the parts of said driving means being arranged about said member to form a compact unit substantially symmetrical with respect to said member, and a switch mechanism controlling the motor operable in the valve-actuating movements of said operating shaft.

4. An electrically driven operator for radiator control valves and the like comprising, in combination with a valve member to be operated, a rotatably mounted operating shaft, an electric motor having a driving shaft disposed parallel with the operating shaft, a spur gear train providing a torque-multiplying driving connection between said shafts comprising a high speed section adjacent the motor and a low speed section adjacent the operating shaft, a casing enclosing the high speed section of the train, means operable in successive cycles of rotation of the operating shaft to impart opening and closing movements to said valve member, and a controlling switch mechanism for the motor operable in the rotation of said operating shaft.

5. An electrically driven operator for radiator control valves and the like comprising, in combination with a valve member to be operated, a rotatably mounted operating shaft, an electric motor having a driving shaft, a torque-multiplying driving connection between said shafts including intermeshing spur gears adjacent the motor, means operable in successive cycles of rotation of the operating shaft to actuate the valve member, a controlling switch mechanism for the motor operable in the rotation of said operating shaft and a casing enclosing said spur gears and providing an oil bath in which said gears operate.

6. A power operator for a valve having a casing and a valve element movable toward and from a seat in said casing, said operator combining a frame mounted on said casing, an elongated member projecting from said casing and arranged for endwise movement to actuate said valve element, an operating shaft extending transversely of said member and rotatably supported on said frame for actuating said member from said shaft, driving means for said operating shaft located on one side thereof and including an electric motor having a rotary drive shaft connected to said operating shaft through speed reduction gearing, a series of switch contacts spaced along said operating shaft on the side thereof opposite said driving means and arranged to control the motor, and means on said operating shaft for actuating said contacts.

7. An electrically driven valve operator of the class described having, in combination, a rigid frame comprising a pair of supporting members rigidly secured together in spaced parallel relation, a main operating shaft journaled at opposite ends in said supporting members, an electric motor mounted in said frame, means providing a driving connection between the motor and said main operating shaft, an actuating element on the operating shaft substantially centrally thereof, an elongated stem having one end operatively associated with said actuating element and extending substantially centrally through the frame for connection at its other end with a valve member to be operated, said actuating element being operable in the rotation of the operating shaft to actuate said stem so as to impart positive movements thereto in opposite directions, and a switch mechanism for controlling the operation of said main operating shaft by said motor including a plurality of spring contacts, means on said supporting members carrying said contacts in insulated relation to the frame, and means on the main operating shaft for actuating said contacts.

8. An electrically driven operator for heat control valves and the like comprising, in combination with a valve member to be operated, a supporting frame comprising a pair of spaced parallel side standards, a valve operating stem disposed centrally of the frame parallel to said standards, a main operating shaft journaled in said standards and extending transversely of the axis of said stem, an electric motor mounted in said frame and having a drive shaft disposed parallel to said operating shaft, a driving connection between said shafts comprising a series of intermeshing spur gears, an intermediate bearing member cooperating with one of the side standards to support said gears, a valve actuating device interposed between said operating shaft and said stem and operable in the rotation of the operating shaft to impart positive opening and closing movements to the valve member, and a controlling switch mechanism for the motor operable in the rotation of said operating shaft.

9. An electrically driven operator for heat control valves and the like comprising, in combination with a valve member to be operated, a supporting frame comprising a base and a pair of spaced parallel supporting standards, a valve operating stem disposed centrally of the frame parallel to said standards, a shaft journaled in said standards near the end of the frame remote from said base and extending transversely of the axis of said stem, an electric motor mounted in said frame adjacent the base and having a driving connection with the shaft, a valve actuating device interposed between said shaft and said stem and operable in the rotation of the shaft to impart positive opening and closing movements successively to the valve member, and a controlling switch mechanism for the motor including a series of spring contacts, means carried by said standards to support said contacts on the side of the shaft opposite the motor, and actuating means on said shaft for said contacts.

10. A power operator for a valve having a casing and a valve element movable toward and from a seat in the casing, said operator combining an elongated member projecting from said casing and arranged for endwise movement to seat and unseat said valve element, a frame including a base adapted to be mounted on said casing and a standard rigid with said base and projecting therefrom alongside of said member, an operating shaft extending transversely of said member and rotatably supported on said standard near the end thereof opposite said base, an electric motor having a rotary drive shaft and mounted on said frame adjacent said member and between said operating shaft and said base, speed reduction gearing connecting said shafts, a controlling switch mechanism for the motor operable to cause the same to impart to said operating shaft successive angular movements of predetermined length, means connecting said operating shaft to said member and operable in said successive movements of the operating shaft to move said member and valve element alternately in opposite directions whereby to seat and unseat the latter, and a spring associated with the connection between said operating shaft and valve element and operable to yield and thereby permit limited movement of said operating shaft after said valve element has been seated.

11. A power operator for a valve having a casing and a valve element movable toward and from a seat in said casing, said operator combining an elongated member projecting from said casing and arranged for endwise movement to actuate said valve element, an operating shaft extending transversely of said member and rotatably supported near the end of said member remote from said valve casing, means for actuating said member from said shaft, driving means for said shaft disposed about said member between said shaft and casing and including an electric motor having a rotary drive shaft connected to said operating shaft through speed reduction gearing, a series of switch contacts located on the side of said operating shaft opposite said driving means and arranged to control the motor, and means on said operating shaft for controlling the actuation of said contacts to determine the extent of movement of said operating shaft.

12. An electrically driven valve operator of the class described having, in combination with a valve member, a rigid frame comprising a base, a pair of bearing plates rigidly secured at one end to said base in laterally spaced relation, a main operating shaft journaled at opposite ends in said bearing plates, an electric motor having a driving connection with said main operating shaft, means operable in the rotation of the shaft to actuate said valve member so as to impart successive movements thereto, and a switch mechanism for controlling the operation of said main shaft by said motor including a plurality of stationary contacts, an insulating support for said contacts mounted between said plates, a plurality of movable contact carrying arms, and rotary disks on the main shaft for actuating said contact arms.

13. A power operator for a valve having a casing and a valve element movable toward and from a seat in said casing, said operator combining an elongated member projecting from said casing and arranged for endwise movement to actuate said valve element, a rotatable operating shaft extending transversely of said member, means for actuating said member from said shaft, an electric motor having a rotary drive shaft connected to said operating shaft through speed reduction gearing, a spring associated with the connection between said operating shaft and said valve element and operable in the valve-closing cycle to yield and permit limited movement of the operating shaft after the valve element has been seated, switching means controlling said motor, and means rotatable with said operating shaft for actuating said switching means to control the valve-actuating movements of the shaft.

14. An electrically driven operator for radiator control valves and the like comprising, in combination with a valve member to be operated a rotatable mounted shaft, an electric motor having a driving connection with said shaft, and a valve actuating device operable to impart positive opening and closing movements to the valve member and comprising a tubular valve operating stem, a cam on said shaft, and a follower for the cam, said stem and follower being formed from two similar elongated sections secured together in abutting relation.

15. An electrically driven operator for radiator control valves and the like comprising, in combination with a valve member to be operated, a rotatably mounted shaft, an electric motor having a driving connection with said shaft, and a valve actuating device operable to impart positive opening and closing movements successively to the valve member and comprising a tubular valve operating stem, a cam on said shaft, and a follower for the cam, said stem and follower being formed from two similar elongated sections secured together in abutting relation, and spaced apart at one end to receive said cam, and the follower having rollers secured between the spaced portions on opposite sides of the cam.

16. The combination of a control valve having a casing, a valve member reciprocable toward and from a seat in the casing, a shaft having an actuating element thereon, an electric motor for rotating said shaft, an elongated valve operating stem having one end connected to the valve member and a reciprocatory member connected to the opposite end of said stem and adapted to impart longitudinal movements to the stem in the rotation of said actuating element, said reciprocatory member having means slidably engaging said shaft for guiding the reciprocatory member in its movements transversely of the shaft.

17. The combination of a control valve having a casing, a reciprocable valve-operating member, a frame mounted on the casing, a shaft journaled in said frame substantially perpendicular to the axis of movement of said member, a cam on said shaft, a cam follower comprising a plate having guide surfaces slidably engaging said shaft and having a pair of rollers disposed on opposite sides of the cam, means connecting said follower with said member, and an electric motor for driving said shaft.

18. The combination of a control valve having a casing and a valve member movable axially toward and from a seat in the casing, a rotatably mounted shaft, means including an electric motor for imparting a rotary movement to said shaft, a valve operating stem connected at one end to said valve member, a flexible diaphragm forming a seal about said stem but permitting a substantially unrestricted movement of the valve member, means operable to reciprocate said stem in the rotation of said shaft, and means for controlling the operation of said motor to define individual valve opening and closing cycles, the means for reciprocating the stem being operable at the end of the valve closing cycle to hold the valve member firmly against its seat.

19. The combination of a radiator control valve having a body and a valve member to be operated, a support adapted to be mounted on said body, a hollow casing having an open end removably seated on said support, and an electrically driven operator for the valve wholly enclosed within said casing, said operator comprising an elongated reciprocatory actuator connected at one end with the valve member and extending through said support into the casing, a pair of laterally spaced bearing members projecting from said base longitudinally into the casing on opposite sides of said actuator, an operating shaft journaled in said bearing members and disposed transversely of the casing, an electric motor, speed reducing gearing between the motor and said shaft including a series of spur gears mounted adjacent one of said bearing members, means connecting said shaft and actuator for moving the valve member into open and closed positions, and a controlling switch mechanism for the motor operable in the rotation of said shaft.

20. The combination of a radiator control valve having a body and a valve member to be operated, a support adapted to be mounted on the valve body, a hollow casing having an open end removably seated on said support, and an electrically driven operator for the valve wholly enclosed within said casing, said operator comprising an elongated reciprocatory actuator connected at one end with the valve member and extending through said support into the casing substantially centrally thereof, a standard projecting from said support into said casing, an operating shaft journaled in said standard and disposed transversely of the casing, an electric motor having a drive shaft parallel to said operating shaft, a spur gear train connecting said shafts, means connecting said operating shaft and said actuator operable in the rotation of the motor shaft to move the valve member positively in opposite directions, and a controlling switch mechanism for the motor operable in the rotation of said shaft.

21. The combination of a radiator control valve having a body and a valve member movable toward and from a seat in said body, a hollow casing having a base adapted to be mounted on the valve body, and a power operator for the valve wholly enclosed within said casing and comprising an elongated reciprocatory actuator connected at one end with the valve member and extending through said base into the casing substantially centrally thereof, an operating shaft disposed transversely of the casing, an electric motor, speed reducing gearing between the motor and said shaft, means connecting said shaft and actuator and operable in successive half revolutions of said shaft in the same direction to move the valve member alternately toward and from its seat, and a controlling switch mechanism for the motor operable to define successive half revolutions of said shaft.

22. The combination of a radiator control valve having a body and a valve member movable axially toward and from a seat in said body, a hollow casing having a base adapted to be mounted on the valve body, and a power operator for the valve wholly enclosed within said casing and comprising an elongated reciprocatory actuator connected at one end with the valve member and extending through said base into the casing substantially centrally thereof, an operating shaft mounted transversely of the casing, an electric motor, speed reducing gearing between the motor and said shaft, means connecting said shaft and said actuator and operable in the rotation of the shaft to move the valve member in opposite directions, and a controlling switch mechanism for the motor operable in the valve opening and closing movements of said shaft.

23. The combination of a radiator control valve having a body with an open side and a valve element movable axially toward and from a seat in the body and having an operating stem projecting through said open side, a cap member secured upon the open side of the body and apertured to receive said stem, means between said member and said valve stem forming a seal about the stem, power means for operating the valve having a supporting base mounted on said member, said power means comprising an electric motor, means driven from the motor and connected with said operating stem to reciprocate the valve element, and a controlling switch mechanism for governing the operation of the motor, a casing coacting with said base to wholly enclose said power means, said cap member having means supporting said base in spaced relation thereto and constructed to provide a space open to the atmosphere whereby to permit the escape of steam or the like leaking past said sealing means, and means interposed between the base and the cap member for preventing the passage of escaping steam through the base into said casing.

24. A power operator for moving a valve member toward and from its seat combining a rotatable shaft, an electric motor for driving said shaft, a cam on said shaft, a follower for said cam, a yieldable connection between said follower and said member having a spring interposed therein, said cam having a dwell surface adapted to be engaged by said follower after the latter has been moved beyond valve-closing position and said spring thereby stressed to hold the member seated with a predetermined pressure, and switch-mechanism actuated in timed relation to the movements of said shaft and operable in the closing of said valve to stop said shaft with said dwell surface engaging said follower.

25. A power driven operator for radiator control valves and the like having a body and a valve member movable axially toward and from a seat in said body, said operator comprising a casing having a base adapted to be mounted on the valve body, an operating shaft mounted transversely of the casing, an electric motor, speed reducing gearing between the motor and said shaft, and means operatively connecting said shaft and said valve member including a rotary element on the shaft and a reciprocatory member operatively associated with said element and having a part projecting through said base for connection with said valve, said element being operable in the rotation of the shaft to move said reciprocatory member and thereby the valve member positively in opposite directions, and said connecting means including a spring adapted upon the movement of the valve member into closed position to yield and permit limited movement of the operating shaft after the valve member has been seated whereby to hold the valve member to its seat with a yielding pressure, and a controlling switch mechanism for the motor operable in the rotation of said shaft.

26. A power driven operator for a control valve having a body and a valve member reciprocable axially between two extreme positions in said body, said operator comprising a frame including a base plate adapted to be mounted on said body and a standard projecting from said base plate, a shaft journalled in said standard in spaced parallel relation to said base plate, an electric motor mounted on said frame and having a spur gear driving connection with said shaft, a cam on said shaft, a controlling switch mechanism for the motor operable to interrupt the rotation of the shaft with said cam in either of two positions, and means operable in the rotation of said cam to actuate said valve member including a follower for said cam and a spring arranged to be placed under stress by the cam when said valve member is in one of its said extreme positions, said cam having a dwell surface thereon engaged by said follower in said one extreme position of the valve member whereby to prevent rotation of the cam by said spring when the latter is under stress.

In testimony whereof we have hereunto affixed our signatures.

HOWARD D. COLMAN.
DUNCAN J. STEWART.

Certificate of Correction

Patent No. 1,903,229.                                                        March 28, 1933.

HOWARD D. COLMAN ET AL.

It is hereby certified that error appears in the printed specification of the above-numbered patent requiring correction as follows: Page 3, line 108, for "$17^b$" read $71^b$; page 7, line 122, claim 13, for "vave" read *valve*; and line 130, claim 14, for "rotatable" read *rotatably*; page 8, line 17, claim 15, strike out the word *successively*; and that the said Letters Patent should be read with these corrections therein that the same may conform to the record of the case in the Patent Office.

Signed and sealed this 2nd day of May, A. D. 1933.

[SEAL]                                                                       M. J. MOORE,
*Acting Commissioner of Patents.*